(12) United States Patent
Proksa et al.

(10) Patent No.: US 8,338,791 B2
(45) Date of Patent: Dec. 25, 2012

(54) DIGITAL PULSE PROCESSING FOR MULTI-SPECTRAL PHOTON COUNTING READOUT CIRCUITS

(75) Inventors: Roland Proksa, Hamburg (DE); Jens-Peter Schlomka, Hamburg (DE); Ewald Roessl, Ellerau (DE); Tuvia Liran, Quiriat Tivon (IL); Aviv Marks, Raanana (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 319 days.

(21) Appl. No.: 12/665,558

(22) PCT Filed: May 23, 2008

(86) PCT No.: PCT/IB2008/052042
§ 371 (c)(1),
(2), (4) Date: Jul. 13, 2010

(87) PCT Pub. No.: WO2008/155679
PCT Pub. Date: Dec. 24, 2008

(65) Prior Publication Data
US 2010/0270472 A1    Oct. 28, 2010

Related U.S. Application Data

(60) Provisional application No. 60/944,861, filed on Jun. 19, 2007.

(51) Int. Cl.
*G01J 5/02* (2006.01)
(52) U.S. Cl. ..................................... 250/369
(58) Field of Classification Search .......... 250/369, 250/370.01–370.15, 362, 363.01–363.1; 378/98.8
See application file for complete search history.

(56) References Cited

U.S. PATENT DOCUMENTS

| | | | |
|---|---|---|---|
| 3,814,937 A | | 6/1974 | Lowes |
| 4,883,956 A | * | 11/1989 | Melcher et al. ............ 250/269.2 |
| 4,922,442 A | | 5/1990 | Bolk et al. |
| 5,270,547 A | | 12/1993 | Stark et al. |
| 5,349,193 A | * | 9/1994 | Mott et al. ............... 250/370.06 |
| 5,393,982 A | * | 2/1995 | Mott et al. ............... 250/370.06 |
| 5,532,944 A | * | 7/1996 | Battista ............................ 708/3 |
| 5,684,850 A | * | 11/1997 | Warburton et al. ............. 378/53 |
| 2003/0183754 A1 | | 10/2003 | Wolleschensky et al. |
| 2006/0276706 A1 | | 12/2006 | Klein et al. |

FOREIGN PATENT DOCUMENTS

JP    01265184 A    10/1989

OTHER PUBLICATIONS

Kalender, et al.; Evaluation of a prototype dual-energy computed tomographic apparatus 1. Phantom studies; 1986; Med. Phys.; 13(3)334-339.
Spieler, H.; Semiconductor Detector Systems; 2005; Oxford Science Publications; Section 1: pp. 1-6.

* cited by examiner

*Primary Examiner* — Kiho Kim (57) ABSTRACT

An apparatus includes a local minimum identifier (408) that identifies a local minimum between overlapping pulses in a signal, wherein the pulses have amplitudes that are indicative of the energy of successively detected photons from a multi-energetic radiation beam by a radiation sensitive detector, and a pulse pile-up error corrector (232) that corrects, based on the local minimum, for a pulse pile-up energy-discrimination error when energy-discriminating the pulses using at least two thresholds corresponding to different energy levels. This technique may reduce spectral error when counting photons at a high count rate.

29 Claims, 8 Drawing Sheets

DIGITAL PULSE PROCESSING FOR MULTI-SPECTRAL PHOTON COUNTING READOUT CIRCUITS

CROSS REFERENCE TO RELATED APPLICATIONS

This application claims the benefit of U.S. provisional application Ser. No. 60/944,861 filed Jun. 19, 2007, which is incorporated herein by reference.

The present application generally relates to multi-spectral photon counting detectors. While it is described with particular application to computed tomography (CT), it also relates to other applications in which it is desirable to energy-resolve detected photons of different energies.

A computed tomography (CT) system has included a radiation source that emits multi-energetic ionizing photons that traverse an examination region. Such a system has also included a radiation sensitive detector located opposite the examination region from the radiation source. The detector has included a sensor that detects photons that traverses the examination region and produces an electrical current pulse for each detected photon. The detector has also included electronics for energy-resolving the detected photons based on the electrical current.

Figure 1:
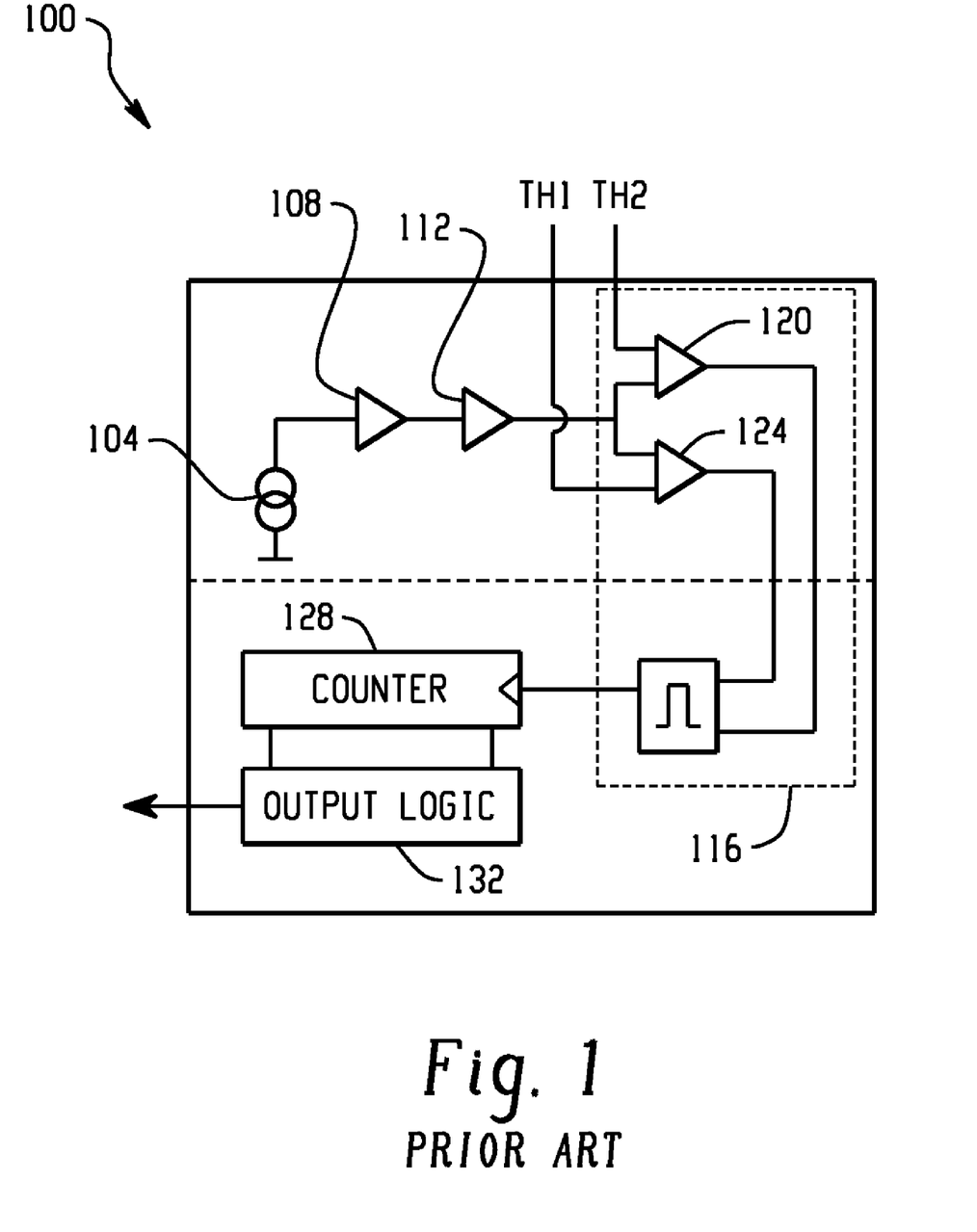
FIG. 1 illustrates a conventional dual-energy detector.

By way of example, FIG. 1 illustrates a conventional dual energy detector 100 having a sensor 104 that produces an electrical current indicative of a detected photon. The electrical current is amplified by a pre-amplifier 108 and provided to a pulse shaper 112, which generates an analog voltage pulse having peak amplitude that is indicative of the energy of the detected photon. A discriminator 116 includes two comparators 120 and 124 that respectively compare the amplitude of the analog voltage pulse with two voltage thresholds TH1 and TH2 that corresponds to particular energy levels. Each of the comparators 120 and 124 produces a signal that transitions from low to high when the amplitude rises and crosses its threshold and from high to low when the amplitude decreases and crosses its threshold. A counter 128 counts the number of rising edges for each threshold, and output logic 132 conveys the counts. A first energy bin has been defined as the range of energies between TH2 and TH1, and a second energy bin has been defined as the range of energies greater than TH2. A detected photon has been energy binned by subtracting the count for TH2 from the count for TH1. The result associates the detected photon with one of the energy bins.

Unfortunately, the time between successive photon detections may result in pulse pile-up, or the detector sensor generating an analog signal having overlapping voltage pulses. When pulses overlap, their amplitudes combine and may partially obscure each other such that a comparator for a lower threshold may not see the amplitude of a pulse cross its thresholds when the amplitude of the pulse crosses its threshold. As a result, the comparator output signal for a lower threshold may not include a rising edge for each detected photon having energy greater than the energy corresponding to the threshold, and the count for the lower threshold may be lower than should be. In addition, the amplitude of an overlapping pulse may be energy-shifted by the amplitude contribution of the preceding pulse, and the count for a higher threshold may be incorrect. As a consequence, the energy distribution of the detected photons may be incorrect.

Aspects of the present application address the above-referenced matters and others.

According to one aspect, an apparatus includes a local minimum identifier that identifies a local minimum between overlapping pulses in a signal, wherein the pulses have amplitudes that are indicative of the energy of successively detected photons from a multi-energetic radiation beam by a radiation sensitive detector, and a pulse pile-up error corrector that corrects, based on the local minimum, for a pulse pile-up energy-discrimination error when energy-discriminating the pulses using at least two thresholds corresponding to different energy levels In another aspect, a multi-spectral counting detector includes a sensor that detects photons differing in energy, a pulse shaper that generates an analog signal with an amplitude indicative of the energy of the detected photons, an energy-discriminator that generates a digital signal for each of a plurality of energy thresholds, wherein each digital signal includes a pulse when the amplitude exceeds the corresponding threshold, a pulse pile-up error corrector that corrects the digital signals for missing pulses resulting from pulse pile-up, and a counter that counts a number of pulses in each digital signal for each threshold.

In another aspect, a method includes receiving an analog signal that includes at least two partially overlapping analog pulses with amplitudes indicative of energy of detected photons, wherein the overlapping portions of the pulses additively combine, comparing the amplitude of the analog signal with at least two thresholds, wherein each thresholds corresponds to a different energy level, generating a digital signal for each threshold, wherein a digital signal for a threshold includes a state transition when the amplitude of the analog signal crosses the threshold, correcting the digital signal for each threshold to include a state transition for each detected photon having energy at least equal to the threshold, and counting the number of state transitions for each threshold.

Still further aspects of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 2:
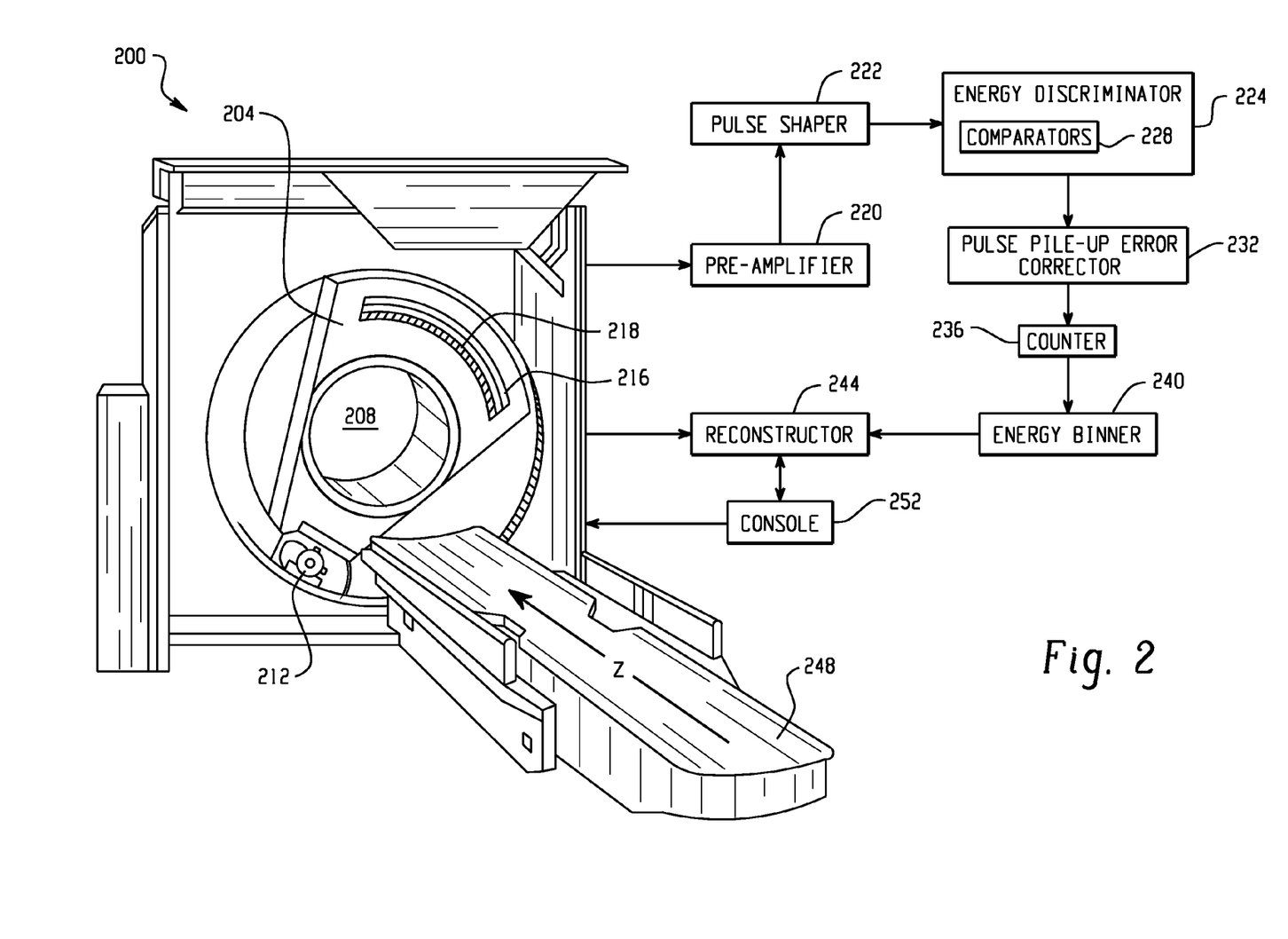
FIG. 2 illustrates an imaging system.

With reference to FIG. 2, a computed tomography (CT) system 200 includes a rotating gantry portion 204 that rotates about an examination region 208 around a longitudinal or z-axis. An x-ray source 212, such as an x-ray tube, is supported by the rotating gantry portion 204 and emits a multi-energetic radiation beam or photons that traverse the examination region 208. A radiation sensitive detector 216 includes one or more sensors such as a sensor 218 that detects photons emitted by the source 212 that traverse the examination region 208. The sensor 218 generates electrical signals, such as electrical currents or voltages, which are indicative of respective detected photons.

A pre-amplifier 220 amplifies each electrical signal. A pulse shaper 222 processes the amplified electrical signal for a detected photon and generates a corresponding analog signal that includes a pulse such as a voltage or other pulse indicative of a detected photon. In this example, the pulse has peak amplitude that is indicative of the energy of the detected photon.

An energy discriminator 224 energy-discriminates the analog pulse. In this example, the energy discriminator 224 includes a plurality of comparators 228 that respectively compare the amplitude of the analog signal with a threshold that corresponds to a particular energy level. Each comparator 228 produces an output signal that is indicative of whether the amplitude of the pulse exceeds its threshold. In this example, the output signal from each comparator produces a digital signal that includes a transition from low to high (or high to low) when the pulse amplitude increases and crosses its threshold, and from high to low (or low to high) when the pulse amplitude decreases and crosses its threshold.

Figure 3:
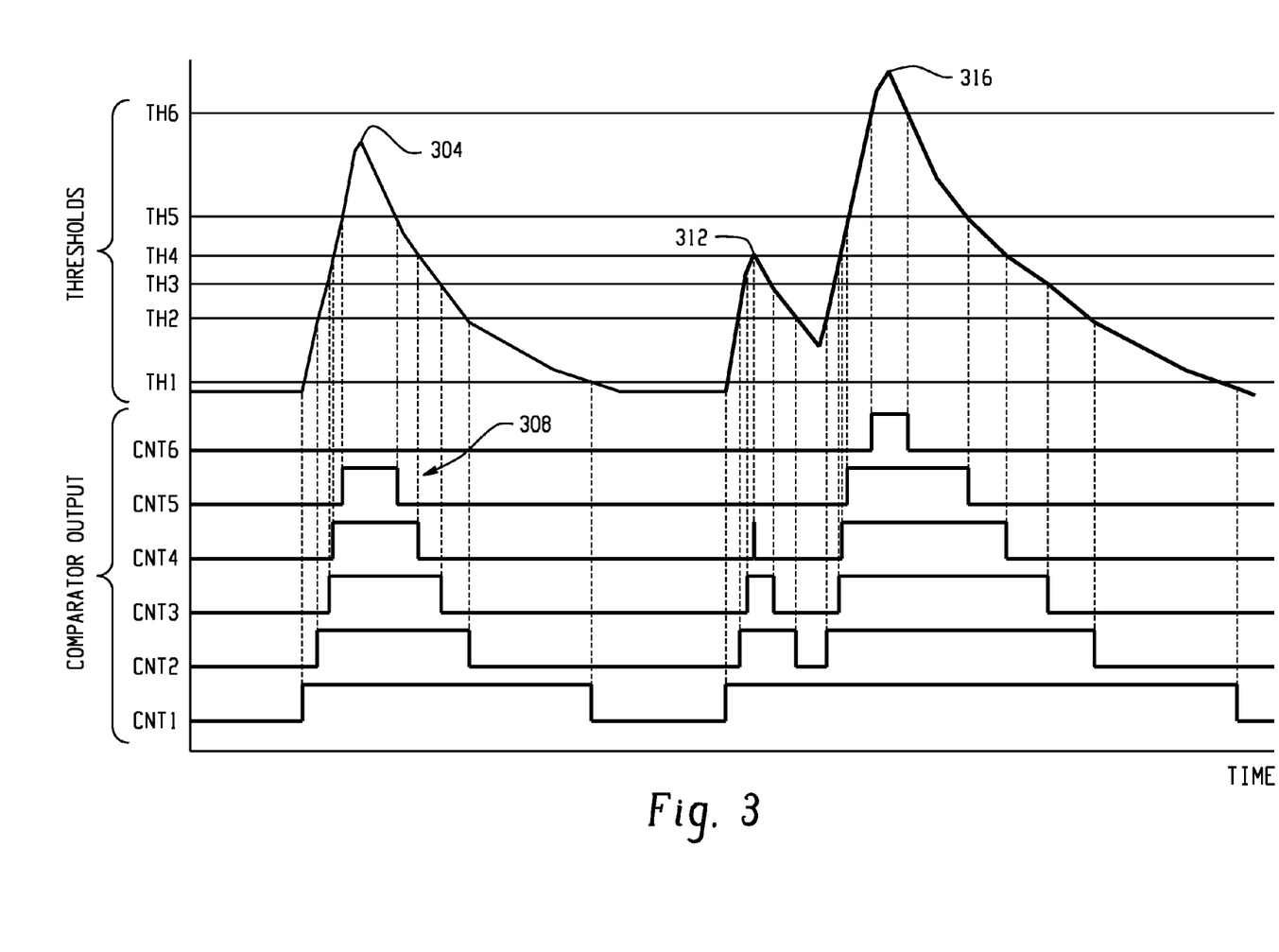
FIG. 3 illustrates piled-up pulses.

A pulse pile-up error corrector 232 processes the digital signals output by each of the comparators 228 and corrects for pulse pile-up errors. When pulses pile-up, their amplitudes combine and the signal output by a comparator for a lower threshold may not include a rising edge for each detected photon having energy greater than the energy corresponding to the lower threshold and/or a signal output by a comparator for a higher threshold may erroneously include a rising edge. By way of example, FIG. 3 shows a first, non-overlapped pulse 304 superimposed over six energy thresholds TH1-TH6 and the output of six comparators 308 used to energy-discriminate the pulse 304. As depicted, the output of each comparator transitions from low to high when the amplitude increases and crosses its threshold and from high to low when the decreases and crosses its threshold.

FIG. 3 also shows piled-up second and third pulses 312 and 316 with respect to the six energy thresholds TH1-TH6. As depicted, the amplitudes of the pulses combine such that in the aggregate signal the decay of the second pulse 312 and the rise of the third pulse 316 across the lowest energy threshold, TH1, are obscured. In addition, the amplitude contribution of the first pulse 312 has erroneously shifted the amplitude of the second pulse 316 above the threshold TH6. FIG. 3 also shows the output of the comparators for such piled-up pulses. As depicted, the output of the comparator for the lowest threshold, TH1, does not include a rising edge for the second pulse and the output of the comparator for the highest threshold, TH6, erroneously includes a rising edge.

Returning to FIG. 2, the pulse pile-up error corrector 232 identifies one or more demarcations for distinguishing pulses such as a pulse maximum and/or a local minimum between pulses and corrects for pulse pile-up errors based on the demarcation, as described in greater detail below.

A counter 236 counts the rising edges respectively for each threshold. The counter 236 may include a single counter or individual sub-counters for each threshold. An energy binner 240 energy-bins the counts into energy ranges or bins corresponding to ranges between the energy thresholds. The binned data is used to energy-resolve the detected photons. A reconstructor 244 selectively reconstructs the signals generated by the sensor 118 based on the spectral characteristics of the detected photons. For example, the binned data can be used to generally isolate different types of organic materials having different photon absorbing characteristics such as bone, organic tissue, fat and/or the like, locate contrast enhancement materials, and/or otherwise process the detected signals based on spectral characteristics.

An object support 248 such as a couch supports a patient or other object in the examination region 208. The object support 248 is movable so as to guide the object within respect to the examination region 208 when performing a scanning procedure. A general purpose computer serves as an operator console 252. The console 252 includes a human readable output device such as a monitor or display and an input device such as a keyboard and mouse. Software resident on the console 252 allows the operator to control and interact with the scanner 200, for example, through a graphical user interface (GUI). Such interaction may include instructions for reconstructing the signals based on the energy-binned data.

Figure 4:
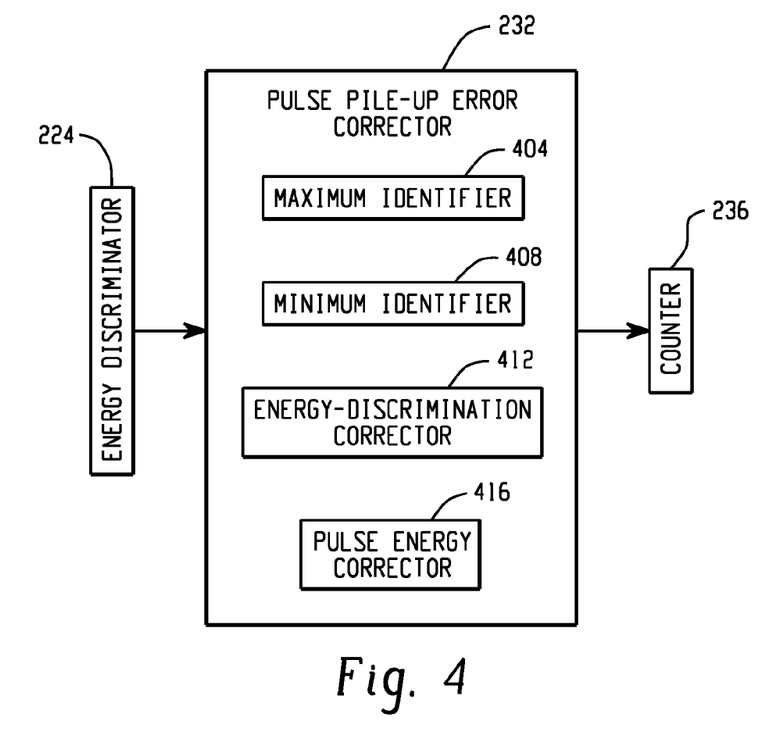
FIG. 4 illustrates a block diagram of a pulse pile-up error corrector.

As shown in FIG. 4, the pulse pile-up error corrector 232 includes a maxima identifier 404 that identifies a maximum of a pulse based on the output signals from the discriminator 224. This includes identifying a transition in the pulse amplitude from increasing to a decreasing. A local minimum identifier 408 identifies a local minimum between pulses based on the output signals from the discriminator 224. This includes identifying a transition in the pulse amplitude from decreasing to increasing via a threshold crossing, wherein a threshold is successively crossed without crossing a lower threshold in between.

An energy-discrimination corrector 412 corrects for errors in the signals from the discriminator 224 based on the pulse maximum and/or local minimum. By way of example, in one instance the energy-discrimination corrector 412 uses the maximum to determine when the output signal from a discriminator 224 should transition from high to low and/or the local minimum to determine when the output signal from a discriminator 228 should transition from low to high. As such, even if a discriminator 224 does not see an amplitude fall below its threshold or an amplitude rise above its threshold without first rising above a next lower threshold, the obscured crossings can be taken into account. In one instance, the signal output by the discriminator 224 may be adjusted based on the maximum and local minimum to correct for such error so that the counter 236 receives corrected signals. In another instance, the local minimum may be used to invoke the counter 236 to count when a rising edge is absent. In other instances, the maximum and/or local minimum may be otherwise used to correct for pulse pile-up errors.

A pulse energy corrector 416 corrects for erroneous energy-shifts resulting from piled-up pulses based on the local minimum. By way of example, the pulse energy corrector 416 uses the local minimum to determine an energy-correction signal that accounts for at least a portion of the contribution of a first of two overlapping pulses to the peak amplitude of a second of the two overlapping pulse. The correction signal is used to subtract or otherwise remove the at least a portion of the contribution of the first pulse. It is to be appreciated that the pulse energy corrector 416 can be omitted.

Figure 5A:
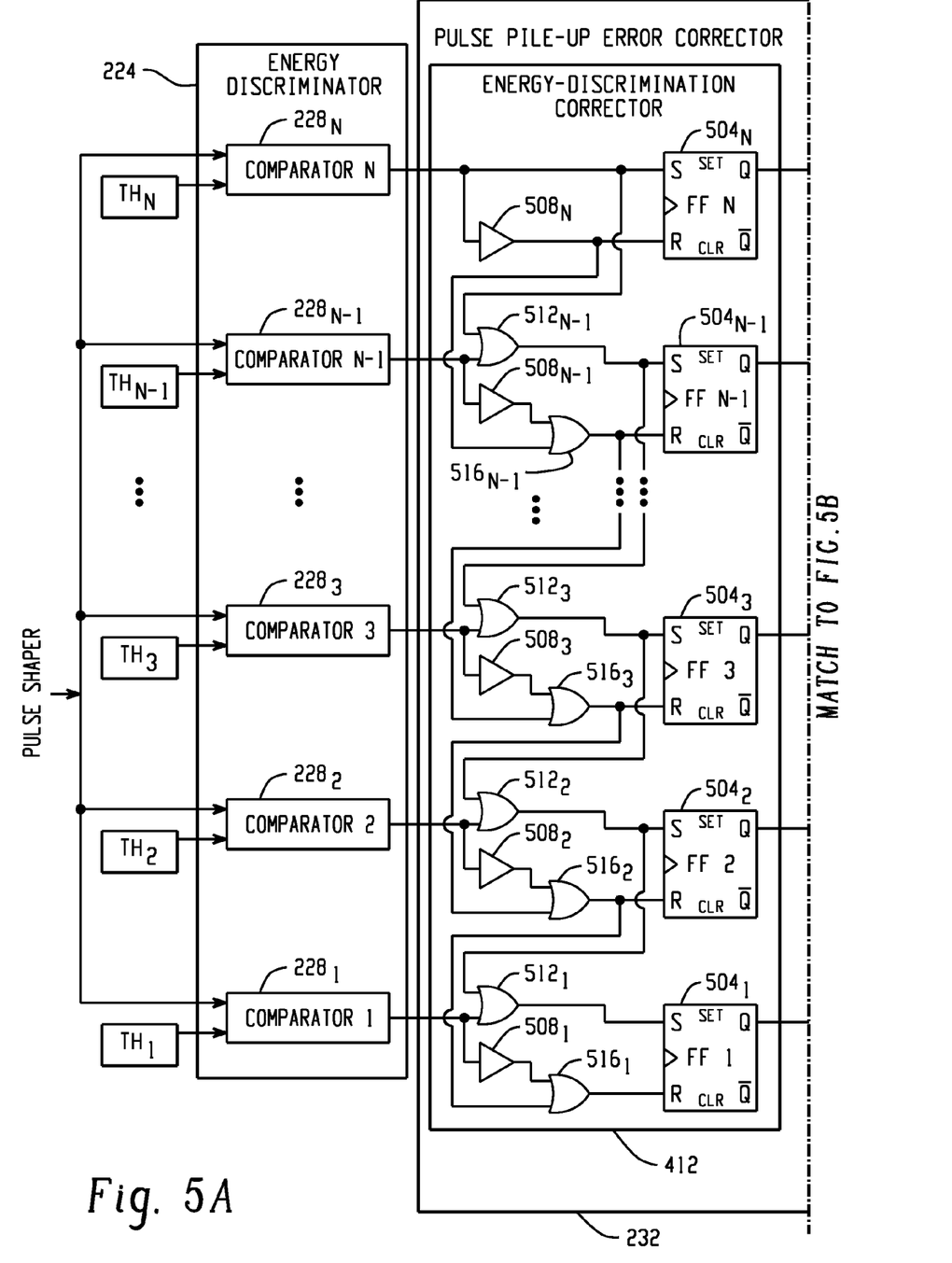
FIGS. 5A and 5B illustrate an implementation of a pulse pile-up error corrector.
Figure 5B:
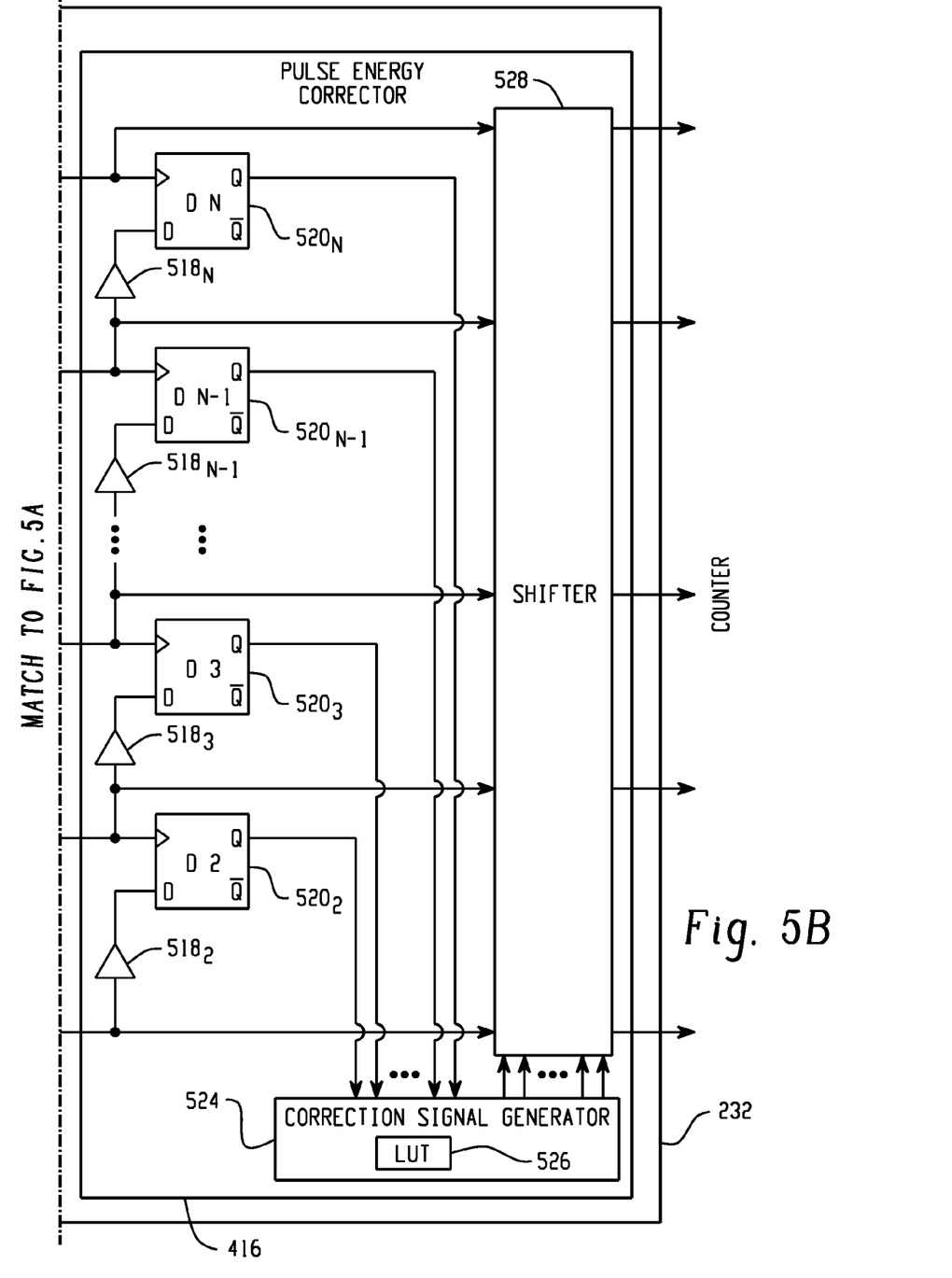

FIGS. 5A and 5B illustrate a non-limiting implementation of the pulse pile-up error corrector 232, along with the energy discriminator 224. It is to be understood that this implementation is provided for explanatory purposes and that other implementations are also contemplated herein. In this implementation, the energy-discriminator 224 includes N comparators $228_1$, $228_2$, $228_3$, ..., $228_{N-1}$, $228_N$ (collectively referred to as comparators 228), and N different thresholds $TH_1$, $TH_2$, $TH_3$, ..., $TH_{N-1}$, $TH_N$ (collectively referred to as thresholds TH). In this example, $TH_1 < TH_2 < TH_3 < ... < TH_{N-1} < TH_N$.

The outputs of the comparators 228 are provided to N reset-set (RS) flip-flops $504_1$, $504_2$, $504_3$, ..., $504_{N-1}$, $504_N$ (collectively referred to as RS flip flops 504) of the energy discrimination corrector 412. As shown, the output of the Nth comparator $228_N$ is conveyed to the set input of the Nth RS flip-flop $504_N$, and an inverted output of the Nth comparator $228_N$ is conveyed to the reset input of the Nth RS flip-flop $504_N$. The output is inverted via an Nth inverter $508_N$.

For the remaining comparators 228, the outputs of the comparators 228 and the inputs to the set input of the RS flip-flop 504 for the next higher threshold are conveyed to an inclusive disjunction logic unit such as OR gates $512_1$, $512_2$, $512_3$, ..., $512_{N-1}$ (collectively referred to as OR gates 512), and the outputs of the OR gates 512 are provided to the set inputs of respective RS flip-flops 504. In addition, the inverted output of the comparators 228 and the inputs to the reset RS flip-flops 504 for the next higher threshold are conveyed to an inclusive disjunction logic unit such as OR gates $516_1$, $516_2$, $516_3$, ..., $516_{N-1}$ (collectively referred to as OR gates 516), and the outputs of the OR gates 516 are provided to the reset inputs of respective RS flip-flops 504. An RS flip-flop 504 is reset via a falling edge from a comparator 228 for a threshold at or above the threshold level corresponding to the RS flip flop 504, which results in a high level at the reset input.

The outputs of the RS flip-flops 504, except for RS flip flop $504_1$, are used to trigger respective positive-edge triggered D flip-flops $520_2$, $520_3$, ..., $520_{N-1}$, $520_N$ (collectively referred to as D flip flops 520). Inverted outputs of the RS flip-flops 504, except for RS flip flop $504_N$, are used as the input to the D flip-flop 520 corresponding to the next higher threshold. Inversion logic such as inverters $518_2$, $518_3$, ..., $518_{N-1}$, $518_N$ (collectively referred to as inverters 518) invert the output of the RS flip flop $504_2$-$504_N$. The D flip-flops 520 are reset via a falling edge from any of the RS flip-flops 504.

A correction signal generator 524 generates an energy-correction signal based on the output of one or more of the D flip-flops 520. In the illustrated embodiment, this includes using a look-up table (LUT) 526 or the like to determine a correction signal that is a function of the amplitude when the amplitude transitions from decreasing to increasing, or the amplitude at the local minimum. In one instance, the correction is approximately half of the output of the D flip-flops 520, which generally corresponds to a correction of the piled-up pulse by about half of the level of the base level of the pulse.

The outputs signals from the RS flip-flops 504 are also provided to a shifter 528, which holds, energy-corrects, if needed, and conveys the corrected signals to the counter 236. The shifter 528 energy corrects the output signals from the RS flip-flops 504 based on the correction signal. In one instance, the number of outputs from the shifter 538 is less than the number of inputs to the shifter 538, which allows use of fewer sub-counters, if desired.

Figure 6:
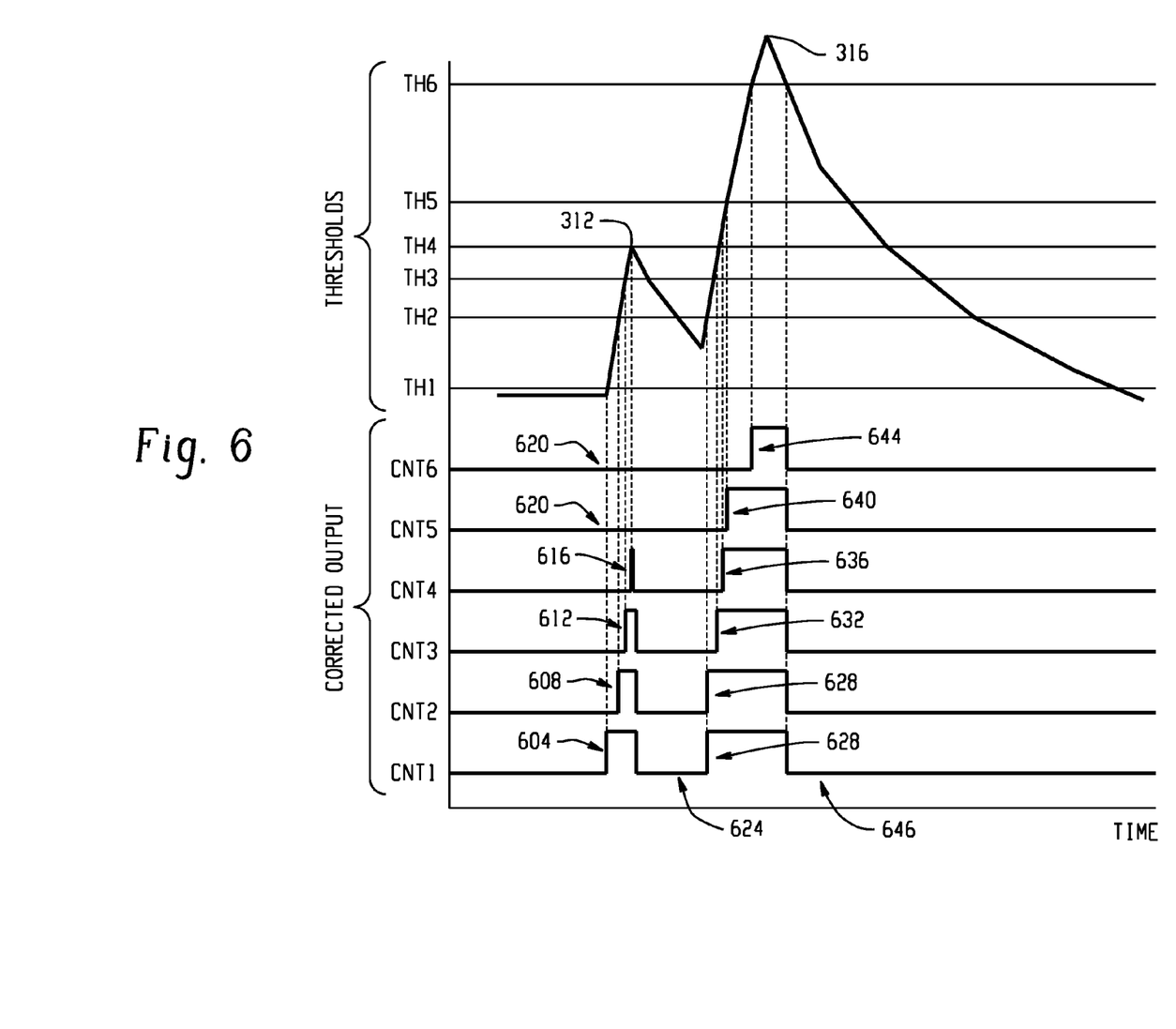
FIG. 6 illustrates a technique for compensating for piled-up pulses.

Operation of the energy discrimination corrector 412 portion of the pulse pile-up error corrector 232, based on the implementation shown in FIG. 5, is described with respect to FIGS. 2, 5, and 6. For this example, the piled up pulses 312 and 316 shown in FIG. 2 are provided to the energy-discriminator 224, which, in this example, includes six comparators 228.

As the amplitude of the pulse 312 increases and crosses $TH_1$, the output of the comparator $228_1$ transitions from low to high. This high state and the outputs of the remaining N-1 comparators 228 are provided to and pulls the output of the OR gate $512_1$ high, which pulls the output of the RS flip-flop $504_1$ high. This is illustrated in FIG. 6 at 604. Returning to FIG. 5, as the amplitude of the pulse 312 continues to increase and crosses $TH_2$, the output of the comparator $228_2$ transitions from low to high. Like above, this pulls the output of the RS flip-flop $504_2$ high. This is illustrated in FIG. 6 at 608. This continues for each threshold crossed as the amplitude continues to increase and cross thresholds. This is illustrated at 612 and 616. For explanatory purposes, in this example, the highest threshold crossed is $TH_4$. The outputs of the comparators $228_5$ and $228_6$ remain low as shown at 620.

When the amplitude of pulse 312 begins to decrease and crosses $TH_4$, the output of the comparator $228_4$ transitions from high to low. This signal is inverted and provided to the OR gate $516_4$, along with the reset signal for the next higher threshold, $TH_5$, which is also low The high signal pulls the output of the OR gate $516_4$ high, which pulls the output of the RS flip-flop $504_4$ low. The reset input of the RS flip-flop $504_4$ is also provided to the OR gate $516_3$, along with the inverted signal from the comparator $228_3$. As a result, the output of the RS flip-flop $504_3$ low is pulled low. This reset is provided to the OR gate $516_2$, along with the inverted signal from the comparator $228_2$, and the output of the RS flip-flop $504_2$ low is pulled low. This reset is provided to the OR gate $516_1$, along with the inverted signal from the comparator $228_1$, which pulls the output of the RS flip-flop $504_1$ low. In general, when the output of a comparator 228 transitions from high to low, the output of the corresponding RS flip-flop 504, as well as the RS flip-flops 504 for any lower thresholds are pulled low. Hence, when a pulse maximum is identified, as determined by an amplitude transition from high to low, the output of the RS flip-flops 504 for thresholds at and below the amplitude transition are pulled low. This is illustrated in FIG. 6 at 624 by the transitions from high to low.

The amplitude of the pulse 312 continues to decrease and eventually crosses $TH_2$. Before crossing $TH_1$, the amplitude of the pulse 316 combines with the pulse 312 such that the aggregate amplitude of the two pluses 312 and 316 begins to increase towards the threshold $TH_2$. As such, the amplitude of the combined pulses does not cross $TH_1$, and the output of the RS flip flop $504_1$ remains low. When the amplitude increases and crosses $TH_2$, the output of the comparator $228_2$ transitions from low to high, and the output of the RS flip flop $504_2$ is pulled high, as described above. This output is also conveyed to the OR gate $512_1$, along with the output of the comparator of $512_1$, which concurrently pulls the output of the OR gate $512_1$ high, which pulls the output of the RS flip flop $504_1$ high. Thus, when the output of a comparator 228 transitions from low to high, the output of the corresponding RS flip-flop 504, as well as the RS flip-flops 504 for any lower thresholds are pulled high, if they are not already high. Hence, when a local minimum is identified, as determined by an amplitude transition from low to high without a crossing of a lower threshold, the output of the RS flip-flops 504 for thresholds at and below the amplitude transition are pulled high. In one instance, this ensures that each detected photon is taken into accounted for each threshold. The output transitions of the RS flip-flops $504_1$ and $540_2$ are illustrated in FIG. 6 at 628.

As the amplitude continues to rise and crosses thresholds, the outputs of the RS flip-flops 504 for the higher thresholds transition between states, as described above. This is illustrated in FIG. 6 at 632, 636, 640, and 644. Likewise, as the amplitude of the pulse 316 begins to fall, the outputs of the RS flip-flops 504 are pulled together to the low state as described above. This is illustrated in FIG. 6 at 646.

For the pulse energy corrector 416 portion of the pulse pile-up error corrector 232, as the amplitude of the pulse 312 increases and crosses $TH_1$, the output of the RS flip-flop $504_1$, which is high, is provided to the shifter 528 and is also inverted, via the inverter $518_2$, and the inverted input is provided to the input of the D flip flop $520_2$. As the amplitude increases and crosses $TH_2$, the output of the RS flip-flop $504_2$, which is high, is provided to the clock input of the D FF $520_2$, and the D FF $520_2$ samples the low input from the RS flip-flop $504_1$. The output of the D flip-flop $520_2$, which is low, is conveyed to the correction signal generator 524. This continues as the amplitude increases and crosses energy thresholds. As noted above, for this example, the highest threshold crossed is TH$_4$. For the higher thresholds, the corresponding D flip-flops 520 output remain low. Since the outputs of all the D flip-flops 520 are low, correction signal does not result in any energy adjustment, and the shifter 528 provides the signals to the counter 236.

As the amplitude of the pulse 312 transitions to a decreasing amplitude and crosses TH$_4$ and the outputs of the RS flip flops 504$_4$-504$_1$ are pulled low, the D flip-flops 520 reset.

The amplitude continues to decrease and crosses TH$_2$, and then increases and crosses TH$_2$ without crossing TH$_1$. As a result, the output of RS flip flops 504$_1$ is not pulled high and a high signal (inverted low) is provided to the input of the D flip flop 520$_2$, When the output of the RS flip-flop 504$_2$ is pulled high, the D flip flop 520$_2$ samples a high signal, and the output of the D flip flop 520$_2$ is pulled high. This results in a high signal being provided to the correction signal generator 524. As the amplitude continues to rise and crosses thresholds, the outputs of the remaining D flip flips 520 remain low as described above.

When the amplitude of the pulse 316 transitions to a decreasing amplitude and crosses TH$_4$, the outputs of the RS flip flops 504$_4$-504$_1$ are pulled low, the D flip-flops 520 reset as described above.

The high signal conveyed to the energy-shift generator 524 is used to determine a correction signal via the LUT 526. The correction signal is provided to the shifter 528 to energy-correct the signal before providing the signal to counter 236. In this respect, the local minimum is used to determine the correction signal. In this example, the correction signal results in a shifts in the signal by one (1) bit. This correction removes at least a portion of the contribution of the amplitude of the pulse 312 from the amplitude of the amplitude of the pulse 316.

Variations are described.

In another embodiment, the pulse pile-up error corrector 232 uses the local minimum to invoke the counter 236 to count instead of adjusting the signal output from the energy discriminator 224. For this embodiment, when a local minimum between pulses is identified, the counter 236 counts for all thresholds at and below the local minimum.

In another embodiment, the counter 236 is configured so that it respectively counts for a threshold when a pulse amplitude rises above the threshold. The counter 236 counts a second time for a second threshold crossing only if the pulse amplitude first falls below the lowest threshold. In one instance, this is achieved through a flag or the like. For example, the counter 236 may include a flag for each threshold. When a flag is set for a threshold, the counter 236 counts when the pulse amplitude exceeds the threshold, and the flag is cleared so that so that exceeding the threshold again will not invoke a count. The flag is reset when the pulse amplitude falls below the lowest or other desired threshold.

Figure 7:
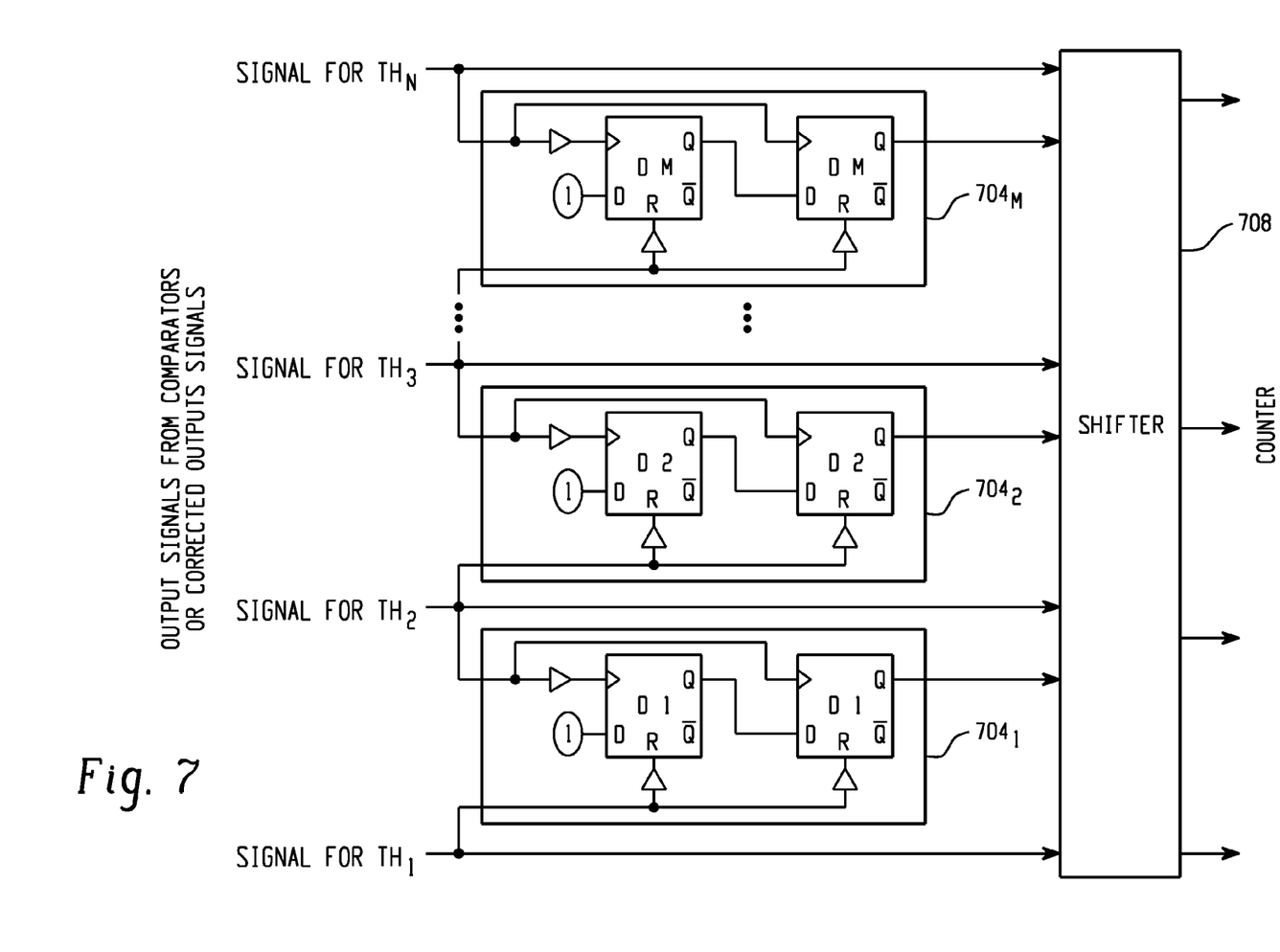
FIG. 7 illustrates an implementation of the pulse energy corrector.

An alternative non-limiting implementation of the energy-shift corrector 416 is shown in FIG. 7. For this implementation, the output signals of the comparators 228 or the corrected output signals are conveyed to local minimum identifiers 704$_1$, 704$_2$, 704$_M$ (collectively referred to herein as local minimum identifiers 704) and a shifter 708. Each local minimum identifier 704 transitions high when the clock input receives an active low input, or low level. In the illustrated example, each local minimum identifier 704 includes two D flip-flops with an asynchronous reset input. The D flip-flops are reset when the reset input receives an active low input. A high signal at the output of one of the local minimum identifiers 704 shifts the output signals based on the level of the local minimum.

It is to be appreciated that the pre-amplifier 220, the pulse shaper, 222, the energy discriminator 224, the pulse pile-up error corrector 232 and/or the counter 236 may be included as part of the detector 116.

Figure 8:
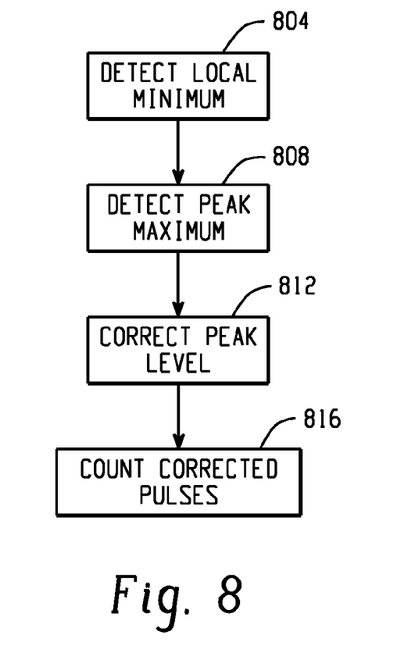
FIG. 8 illustrates a method.

FIG. 8 illustrates a method. At 804, a local minimum at the beginning of a pulse is identified. At 808, the peak level of the pulse is identified at the first falling edge. At 812, the peak level is corrected as a function of the detected pulse minimum. At 816, the corrected pulse is counted.

Applications also include other applications in which it is desirable to count x-rays, gamma rays, or other ionized particles. This includes industrial and medical digital fluoroscopy including mammography, as well as other applications in nuclear physics, astronomy, and/or security.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. An apparatus, comprising:
   a local minimum identifier that identifies a local minimum between overlapping pulses in a signal, wherein the pulses have amplitudes that are indicative of the energy of successively detected photons from a multi-energetic radiation beam by a radiation sensitive detector; and
   a pulse pile-up error corrector that corrects, as a function of local minimum, for a pulse pile-up energy-discrimination error when energy-discriminating the pulses using at least two thresholds corresponding to different energy levels.

2. The apparatus of claim 1, wherein the pulse pile up energy-discrimination error includes obscuring a threshold crossing by the pulse amplitude for at least one of the pulses.

3. The apparatus of claim 1, wherein the pulse pile up energy-discrimination errors include energy shifting the amplitude of the discriminated pulses.

4. The apparatus of claim 1, further including a counter that counts, for each threshold, when the amplitude of the signal increases and crosses the corresponding threshold, wherein the pulse pile-up error corrector adjusts the count for each threshold based on the local minimum.

5. The apparatus of claim 1, further including a counter that counts, for each threshold, when the amplitude of the signal increases and crosses the corresponding threshold, wherein the pulse pile-up error corrector adjusts the count for thresholds corresponding to energy levels at and below the energy corresponding to the local minimum.

6. The apparatus of claim 1, further including an energy-discriminator including at least two comparators that respectively compare the amplitude of the signal with the at least two different thresholds and produce a digital signal indicative thereof, wherein each digital signal includes a state transition when the amplitude increases and crosses a corresponding threshold.

7. The apparatus of claim 6, further including:
   a pulse maximum identifier that identifies a pulse maximum in the signal; and
   an energy-discrimination corrector that corrects the digital signal for the thresholds based on the pulse maximum and the local minimum.

8. The apparatus of claim 7, wherein the correction includes modifying the digital signal so that it includes a state transition for each pulse in the signal having energy greater than the threshold.

9. The apparatus of claim 7, wherein the correction includes concurrently transitioning the state of the digital signal of each threshold to the same state based on the pulse maximum.

10. The apparatus of claim 7, wherein the correction includes concurrently transitioning the state of the digital signal to the same state for thresholds at and below the energy level of the local minimum.

11. The apparatus of claim 6, further including a shifter that shifts a binary representation of the digital signals for a detected photon by at least one bit to remove an energy contribution from an overlapping pulse.

12. The apparatus of claim 6, further including a shifter that shifts a binary representation of the digital signals for a detected photon based on the local minimum.

13. The apparatus of claim 1, further including an energy-shift corrector that generates a correction signal based on the pulse minimum that removes an amplitude contribution of a first of the overlapping pulses from a second of the overlapping pulses.

14. The apparatus of claim 13, further including a shifter the uses the correction signal to energy-correct the digital signal.

15. The apparatus of claim 1, further including:
a counter that counts a number of times an amplitude of the corrected signal increases and crosses each threshold; and
a binner that energy-bins the detected photons into energy ranges based on the counts.

16. The apparatus of claim 1, further including a counter that counts, for each threshold, when the amplitude of the signal increases and crosses the corresponding threshold after a previous amplitude crossing of threshold only if the amplitude decreased and crossed a lowest threshold in between threshold crossings.

17. A multi-spectral counting detector, comprising:
a sensor that detects photons differing in energy;
a pulse shaper that generates an analog signal with an amplitude indicative of the energy of the detected photons;
an energy-discriminator that generates a digital signal for each of a plurality of energy thresholds, wherein each digital signal includes a pulse when the amplitude exceeds the corresponding threshold;
a pulse pile-up error corrector that corrects the digital signals for missing pulses resulting from pulse pile-up; and
a counter that counts a number of pulses in each digital signal for each threshold.

18. The detector of claim 17, wherein the pulse pile-up error corrector includes:
a pulse maxima identifier that detects a pulse maximum in the analog signal;
a local minima identifier that detects a local minimum in the analog signal; and
an energy-discrimination corrector that corrects the pulses in the digital signal based on the maximum and the minimum.

19. The detector of claim 18, wherein the correction includes modifying the digital signal so that a number in the pulses in the digital signal represents a number of detected photons having energy that at least equals the energy of the corresponding threshold.

20. The detector of claim 17, wherein the pulse pile-up error corrector includes a local minima identifier that detects a local minimum in the analog signal, wherein the counter automatically increments the number of counts for each threshold below the energy of the local minima when the local minimum is located.

21. The detector of claim 17, wherein the pulse pile-up error corrector includes:
a local minima identifier that detects a local minimum in the analog signal; and
a pulse energy corrector that energy-corrects the pulses in the digital signal based on the minima.

22. The detector of claim 21, wherein the local minimum is indicative of a baseline energy that is subtracted from the digital signal.

23. The detector of claim 21, wherein the correction accounts for at least a portion of energy from a detected photon that contributes to the energy of a subsequent detected photon.

24. The detector of claim 21, wherein the correction corresponds to about half of an energy level of a base level of the energy of the photon.

25. A method, comprising:
receiving, with an energy discriminator, an analog signal that includes at least two partially overlapping analog pulses with amplitudes indicative of energy of detected photons, wherein the overlapping portions of the pulses additively combine;
comparing, with the energy discriminator, the amplitude of the analog signal with at least two thresholds, wherein each thresholds corresponds to a different energy level;
generating, with the energy discriminator, a digital signal for each threshold, wherein a digital signal for a threshold includes a state transition when the amplitude of the analog signal crosses the threshold;
correcting, with a pulse pile-up error corrector, the digital signal for each threshold to include a state transition for each detected photon having energy at least equal to the threshold; and
counting, with a counter, the number of state transitions for each threshold.

26. The method of claim 25, further including energy-binning the detected photons based on the counts for each threshold for each detected photon.

27. The method of claim 25, further including locating a local minimum between analog pulses in the analog signal and basing the correction on the local minimum.

28. The method of claim 27, further including locating a maximum of analog pulse in the analog signal and basing the correction on the maximum and the local minimum.

29. The method of claim 25, further including correcting the digital signal for each threshold for each detected photon to remove an amplitude contribution from an overlapping analog pulse.

* * * * *